United States Patent [19]
Schmidt et al.

[11] Patent Number: 6,105,893
[45] Date of Patent: Aug. 22, 2000

[54] BELT WINDING AND TIGHTENING COMBINATION WITH A FORCE LIMITER

[75] Inventors: Thomas Schmidt, Timmendorfer Strand; Frank Fugel, Halstenbek, both of Germany

[73] Assignee: Autoliv Development AB, Sweden

[21] Appl. No.: 09/142,810

[22] PCT Filed: Mar. 7, 1997

[86] PCT No.: PCT/EP97/01151

§ 371 Date: Jan. 12, 1999

§ 102(e) Date: Jan. 12, 1999

[87] PCT Pub. No.: WO97/33778

PCT Pub. Date: Sep. 18, 1997

[30] Foreign Application Priority Data

Mar. 11, 1996 [DE] Germany ............... 196 09 524

[51] Int. Cl.[7] .......................... B65H 75/48; B60R 22/28; B60R 22/34
[52] U.S. Cl. ............. 242/374; 242/379.1; 242/383.4; 242/383; 242/384; 280/805; 280/807
[58] Field of Search ............... 242/374, 379.1, 242/383.4, 383, 384, 384.2; 280/805, 806, 807; 297/471, 472, 478

[56] References Cited

FOREIGN PATENT DOCUMENTS

| | | |
|---|---|---|
| 0 627 345 A1 | 12/1994 | European Pat. Off. . |
| 2 615 150 | 11/1988 | France . |
| 43 31 027 A1 | 3/1995 | Germany . |
| 295 16 628 U1 | 3/1996 | Germany . |

*Primary Examiner*—John Q. Nguyen
*Attorney, Agent, or Firm*—Robert W. Becker & Associates

[57] ABSTRACT

A safety belt reeling device has a belt reeling shaft lockable by a vehicle-sensitive and/or belt-sensitive locking device. A tightening device is provided and a tightening coupling connects the tightening device to the belt reeling shaft when the tightening device is actuated. The tightening device has a drive disc and a drive device for driving the drive disc. A force limiting device having a torsion bar is connected to the belt reeling shaft and to a stationary abutment. A pawl coupling is activated by a tightening movement of the tightening device and the pawl coupling has at least one force limiting pawl for switching on or off the force limiting device as a function of functional states of the safety belt reeling device. The pawl coupling also has a coupling ring performing a rotation by an angular distance relative to the belt reeling shaft in a rotational direction of the belt reeling shaft defined by the tightening movement, wherein the relative rotation of the coupling ring is realized by the mass inertia of the belt reeling shaft, effective at the start of the tightening movement, relative to the drive disc. A forced control controlling the force limiting pawl is provided for switching on or off the force limiting device.

11 Claims, 4 Drawing Sheets

BELT WINDING AND TIGHTENING COMBINATION WITH A FORCE LIMITER

BACKGROUND OF THE INVENTION

The invention relates to a self-locking safety belt reeling device with a vehicle sensitive and/or belt-sensitive controlled locking device and with a tightening device acting on the belt reeling shaft, comprised of a drive disc driven in rotation by a drive device, wherein the drive disc, upon actuation of the tightening device, is coupled by a tightening coupling to the belt reeling shaft, whereby a force limiting device comprising a torsion bar is provided that, on the one hand, is connected to the rotatable belt reeling shaft and, on the other hand, to a stationary abutment. Further provided is a pawl coupling that is actuated by the tightening device and comprises one or more force limiting pawls for switching on and off the force limiting device as a function of the functional states of the belt reeling device and/or of the tightening device.

A safety belt reeling device combined with a tightening device and a force limiting device, which can be switched on or off according to functional states, is known in different constructive embodiments especially from German Patent Application 43 31 027 and also from European Patent Application 0 627 345. In all of these embodiments the switching on or off of the force limiting device is achieved by a pawl coupling that is controlled by centrifugal force whereby the rotation of the belt reeling shaft caused by the tightening device or by forward movement of the buckled-in person when restrained results in a rotational acceleration and the deflection of the respectively arranged force limiting pawls as a component of the pawl coupling. Since between the functional state of tightening, on the one hand, and the functional state of restraining, on the other hand, a rotational reversal of the belt reeling shaft and thus a forced short term standstill of the belt reeling shaft results, with the known centrifugally controlled pawl couplings the disadvantage is observed that in certain functional positions the force limiting pawls will not remain in the deflected position but upon standstill, due to the loss of centrifugal force, respectively, upon impact, will return into their initial positions so that the directed switching of the force limiting device will not occur. The invention therefor has the object to eliminate this disadvantage for a self-locking safety belt reeling device with the aforementioned features and to provide for a safe control of the force limiting pawls for realizing the desired switched position.

SUMMARY OF THE INVENTION

The solution of this object results, including advantageous embodiments and developments, from the contents of the claims following this description.

The invention is based, in principle, on the idea that the pawl coupling comprises a connecting ring which is rotatable relative to the belt reeling shaft by a certain angular distance in the direction of rotation of the belt reeling shaft determined by the tightening process, whereby the relative rotation of the connecting ring is realized by the mass inertia of the belt reeling shaft relative to the drive disc of the tightening device at the beginning of the tightening step and actuates the force limiting pawl by a forced control into the position corresponding to the functional state. The invention has the advantage that, due to the forced control of the force limiting pawls, a rebound is avoided and the desired switching position is reliably ensured. This also prevents the disadvantage resulting from the reversal of rotational direction (cancellation of the centrifugal force) and the thus occurring short standstill. The forced control of the force limiting pawl is initiated in a simple manner by the relative movement of the coupling ring relative to the belt reeling shaft at the beginning of the tightening movement whereby this relative movement is realized with the already present means in the system, i.e., by employing the mass inertia of the belt reeling shaft relative to the drive of the tightening device. Accordingly, in comparison to known constructions additional components are not required.

A first embodiment of the invention is directed to the constructive embodiment of the aforementioned safety belt reeling shaft in which the torsion bar is arranged in a tubular shaft surrounding it and connected at the end facing the locking device fixedly to the tubular shaft that can be fixed in position by a locking member so as to serve as abutment and with its other end by the tightening coupling to the rotatable belt reeling shaft, whereby the pawl coupling is embodied as a force limiting pawl supported at the belt reeling shaft and engaging a toothing of the tubular shaft. This design is disclosed in detail in German Patent Application 43 31 072 and this disclosure is incorporated by reference. For effecting the forced control in this embodiment, of the invention it is suggested that the coupling ring, provided for the forced control of the force limiting pawl is arranged at the end face of the belt reeling shaft so as to be rotatable relative thereto until reaching a stop provided at the belt reeling shaft and controls in a forced manner by a pin-slot connection the force limiting pawl supported pivotably at the belt reeling shaft.

According to one embodiment of the invention, the coupling ring in its initial position is secured at the belt reeling shaft by a shearing pin. It may also be provided that the coupling ring is rotatable on the belt reeling shaft against the force of a return spring that is supported between the coupling ring and the belt reeling shaft in order to return the safety belt reeling device after the adjusted switched state into its normal function.

For constructive reasons, according to one embodiment of the invention, it may be expedient that the stop for the relative rotation of the coupling ring is provided at a stop ring separate from the belt reeling shaft and arranged adjacent to the coupling ring.

Inasmuch as in the aforementioned belt reeling device the tightening coupling is comprised of a tightening pawl pivotably connected to the drive disc and a toothed ring that is connected to the belt reeling shaft and surrounds with an inner toothing the coupling pawl, according to one embodiment of the invention, it may be provided that the toothed ring of the tightening coupling is embodied as a unitary part of the coupling ring.

A second embodiment of the invention relates to a constructive embodiment of the inventive safety belt reeling device in which the torsion bar is connected with one end directly to the rotatable belt reeling shaft and with the other end to the pawl coupling serving to realize the abutment, whereby the pawl coupling comprises a pawl fixedly stationarily connected to the torsion bar for force limiting pawls connected thereto and a toothed ring with an inner toothing for engagement by the force limiting pawls, whereby the toothed ring is secured at the housing after rotation about a certain angle. The pawl support, upon activation of the tightening device, is coupled by the tightening coupling to the drive disc. This constructive design is disclosed in detail in European patent application 0 627 345 and the disclosure is incorporated by reference. For effecting the forced control in this embodiment of the invention, it is provided that the coupling ring for controlling the force limiting pawl is arranged at the pawl support and is arranged thereat so as to be rotatable relative thereto until contacting a stop provided at the pawl support. The coupling ring comprises cams as well as an inner toothing for coupling the drive disc of the tightening device, whereby the cams, upon rotation of the coupling ring relative to the pawl support, force the force limiting pawls outwardly.

In the same manner as in the first embodiment it may also be provided that the coupling ring is secured at the pawl support by a shearing pin and, with respect to the return of the coupling ring into the initial position, a return spring is positioned between the coupling ring and the pawl support.

According to one embodiment of the invention it is provided that the coupling ring is positioned axially adjacent to the pawl support and engages the circumference of the pawl support with an axial outer projection to thereby secure the force limiting pawls in abutment at the pawl support. The outer projection has windows correlated with the force limiting pawls which, by movement of the coupling ring relative to the pawl support, are moved into a release position to allow penetration thereof by the force limiting pawls until engagement in the toothed ring takes place. This has the advantage that the deflection of the force limiting pawls during tightening takes place in a controlled manner.

With respect to the connection of the pawl support, respectively, of the coupling ring to the tightening coupling, according to one embodiment of the invention, it may be provided that the coupling ring is arranged adjacent to an annularly embodied pawl support and has an axially inner projection relative to the pawl support with an inner toothing for coupling the drive disc of the tightening device whereby the cams for a forced control of the force limiting pawls are radial projections at the inner projection.

BRIEF DESCRIPTION OF THE DRAWING

In the drawing embodiments of the invention are represented which will be explained in the following. It is shown in.

DESCRIPTION OF PREFERRED EMBODIMENTS

Figure 1:
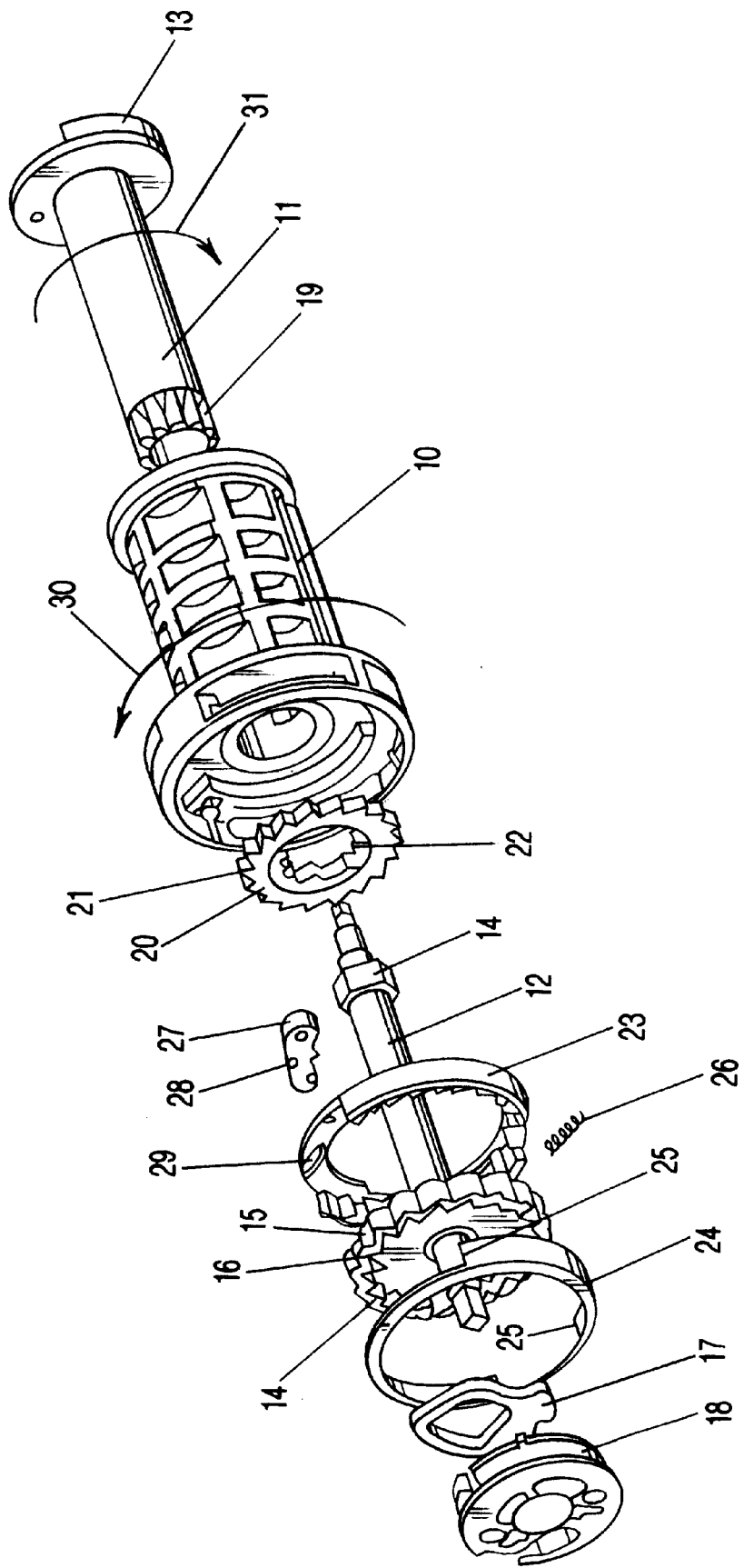
FIG. 1 a first embodiment of the belt reeling shaft of a safety belt reeling device with correlated tightening device as well as force limiting device in a perspective, exploded view.

In the embodiment of the invention represented in FIG. 1, only the belt reeling shaft as well as the necessary parts for the connection of the tightening device as well as of the force limiting device are represented of the safety belt reeling device. As a component of the force limiting device a tubular shaft 11 is inserted into the belt reeling shaft 10, whereby the tubular shaft 11 has at one end a profiled head 13 which can be locked by a non-represented locking system of the safety belt reeling device in the case of actuation. In the interior of the tubular shaft 11 a torsion bar 12 is arranged which at its two ends has respectively formed pieces 14 for providing a fixed connection. The end of the torsion bar 12 facing the profiled head 13 is fixedly connected to the tubular shaft 11 while the other end of the torsion bar 12 is fixedly connected to a toothed ring 15 which has an inner toothing 16 that is a component of the belt tightening coupling. This belt tightening coupling is comprised of a tightening pawl 17 connected to the drive disc 18 of a non-represented cable tightening device which upon actuation of the tightening device is deflected radially until it engages the inner toothing 16 of the toothed ring 15 and thus transmits the rotational movement of the drive disc 18 onto the toothed ring 15.

The tubular shaft 11 is connected with its end opposite the profiled head 13 to an outer end face toothing 19 which engages the inner toothing 22 of a toothed ring 20 positioned on the tubular shaft so that the tubular shaft 11 and the toothed ring 20 are fixedly coupled to one another.

The toothed ring 20 has an outer toothing 21 which is engaged by a force limiting pawl 27 supported on the belt reeling shaft 10 so that in this initial position secured by a non-represented shearing pin a fixed connection between the belt reeling shaft 10 and the tubular shaft 11 is provided.

Axially adjacent to the belt reeling shaft 10 a connecting ring 23 is supported at the end face of the belt reeling shaft 10. It is supported such that it can rotate relative to the belt reeling shaft by a certain angular distance but is fixedly secured outside of this rotational range by stops fixedly connected to the belt reeling shaft 10, which will be explained in the following. Since the rotation of the coupling ring 23 relative to the belt reeling shaft 10 is to be employed for the forced control of the force limiting pawl 27, the force limiting pawl 27 has a pin 28 which is guided in a slot 29 of the coupling ring 23 such that upon rotation of the coupling ring 23 relative to the belt reeling shaft 10 the force limiting pawl 27 is forced outwardly and thus is disengaged from the outer toothing 21 of the toothed ring 20. For limiting the rotational path of the coupling ring 23, a separate stop ring 24 with a stop 25 is provided whereby a return spring 26 is supported between the stop ring 24 and the coupling ring 23. The coupling ring 23 is then also connected to the toothed ring 15 as a component of the tightening coupling such that the coupling ring 23 and the toothed ring 15 always rotate with one another. For this purpose, the coupling ring 23 and the toothed ring 15 can be embodied as a single component (not represented). During normal operation of the safety belt reeling device, the belt reeling shaft 10 rotates in the removal direction as well as in the winding direction, and since the coupling ring 23 and the stop ring 24 at the end faces are initially connected to the belt reeling shaft 10, the aforementioned components also rotate with the rotational movement of the belt reeling shaft 10. Since furthermore the tubular shaft 11 is coupled by the outer toothing 21 of the toothed ring 20 connected to the tubular shaft 11 and the engaged force limiting pawl 27 with the coupling ring 23, the tubular shaft also rotates together with the belt reeling shaft 10 and, because of the form locking connection of the torsion bar 12 with the end of the tubular shaft 11 facing the profiled head 13 and the form-locking connection at its other end to the toothed ring 15 that is a component of the belt tightening coupling, the torsion bar during normal operation of belt reeling shaft will also rotate. Accordingly, the components of the tightening coupling as well as the components of the force limiting device are switched off during normal operation of the safety belt reeling device.

In the case of activation, when the tightening device is actuated, the drive disc 18 is rotated in the tightening direction (arrow 31) in the clockwise direction. Due to the resulting rotational acceleration, the tightening pawl 17 is deflected and engages the inner toothing 16 of the toothed ring 15. Because of the form-locking connections, the rotation of the toothed ring 15 results in a rotational acceleration of the coupling ring 23. Due to the adjusted relative movement possibility of the coupling ring 23 relative to the belt reeling shaft 10, a rotation of the coupling ring 23 relative to the belt reeling shaft 10 occurs first because the belt reeling shaft 10, due to its own mass inertia, will be slowed with respect to the rotational acceleration acting on the coupling ring 23. Due to this relative movement, after breaking off of the pin, the coupling ring 23 will radially outwardly guide the force limiting pawl 27 by the pin-slot connection 28, 29 in a forced control movement and will disengage it from the outer toothing 21 of the toothed ring 20. Accordingly, the tightening process results in the force limiting device being switched on. The stop ring 24 will then entrain the shaft 10. When now, after completion of the tightening movement, a belt removal is caused by the forward movement of the buckled-in passenger, a rotational reversal will take place with respect to the belt reeling shaft 10 so that the belt reeling shaft 10 will turn in the direction of arrow 30. At this point in time the non-represented locking system will be activated and will lock via the profiled head 13 the tubular shaft 11 and the end of the torsion bar 12 fixedly connected thereto in order to provide a stationary abutment. The rotation of the belt reeling shaft 10 in the direction of arrow 30 is now transmitted by the coupling ring 23 rotating with the belt reeling shaft 10 and the toothed ring 15 connected thereto onto the end of the torsion bar 12 that is form-lockingly secured in the toothed ring 15 so that with the belt removal in the direction of arrow 30 a rotation of the torsion rod with simultaneous work uptake results. During the rotational reversal the drive disc 18 remains in engagement with the toothed ring 15 and thus with the coupling ring 23, whereby due to the mass inertia of the drive disc 18 the coupling ring 23 is further loaded with a force that considerably surpasses the force of the return spring 26 so that the coupling ring 23 remains in its position rotated relative to the belt reeling shaft 10. The force limiting pawl 27 remains disengaged from the outer toothing 21 of the toothed ring 20.

When after completion of such a locking process, belt is wound onto the belt reeling shaft by the return spring, then the belt reeling shaft 10 will "pass" in the direction of arrow 31 the "stationary drive" disc 18 so that the tightening pawl 17 will be disengaged from the inner toothing 16 of the toothed ring 15. Accordingly, the coupling ring 23 will come free from the load of the drive disc 18 and the return spring 26 will return the coupling ring 23 into its initial position relative to the belt reeling shaft 10 whereby the pin-slot connection 28, 29 will again return the force limiting pawl 27 into the outer toothing 21 of the toothed ring 20 connected to the tubular shaft 11. Thus, the force limiting device is deactivated and the safety belt reeling device is again functional.

Figure 2:
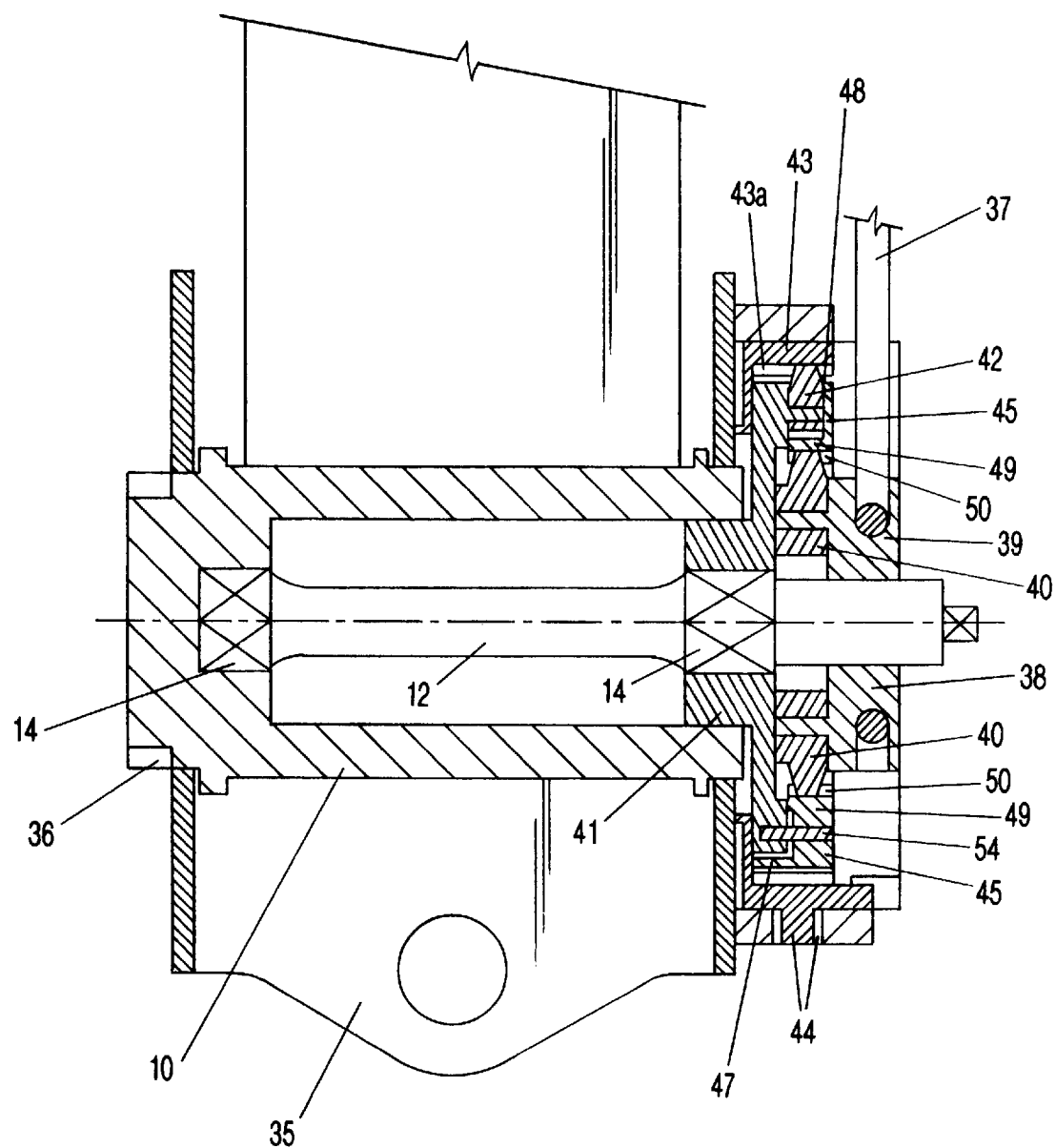
FIG. 2 another embodiment of the invention of a safety belt reeling device including tightening device and force limiting device in a sectional view.
Figure 3:
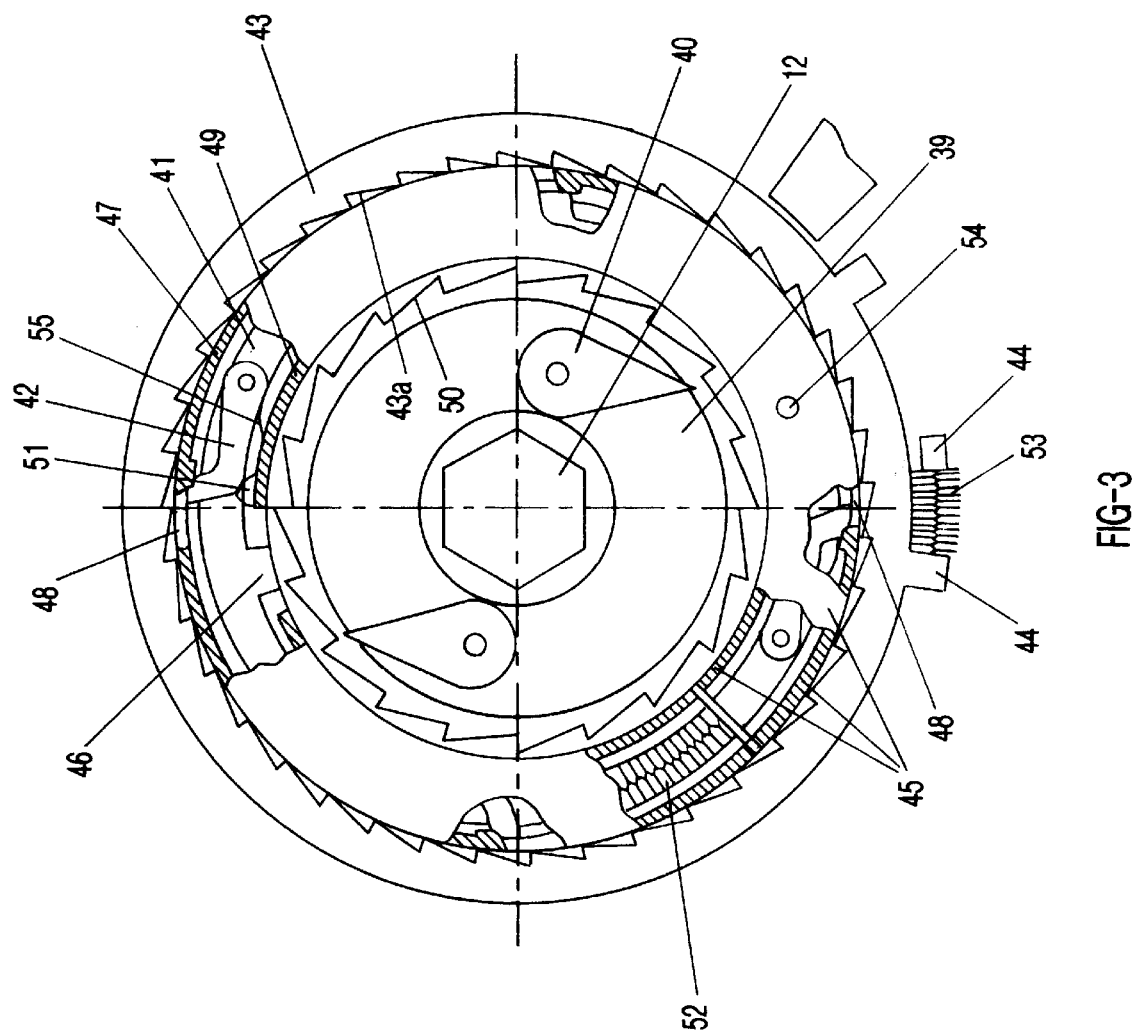
FIG. 3 a sectional view of the coupling between the tightening device, the force limiting device, and the belt reeling shaft for an object according to FIG. 2 in the initial state.
Figure 4:
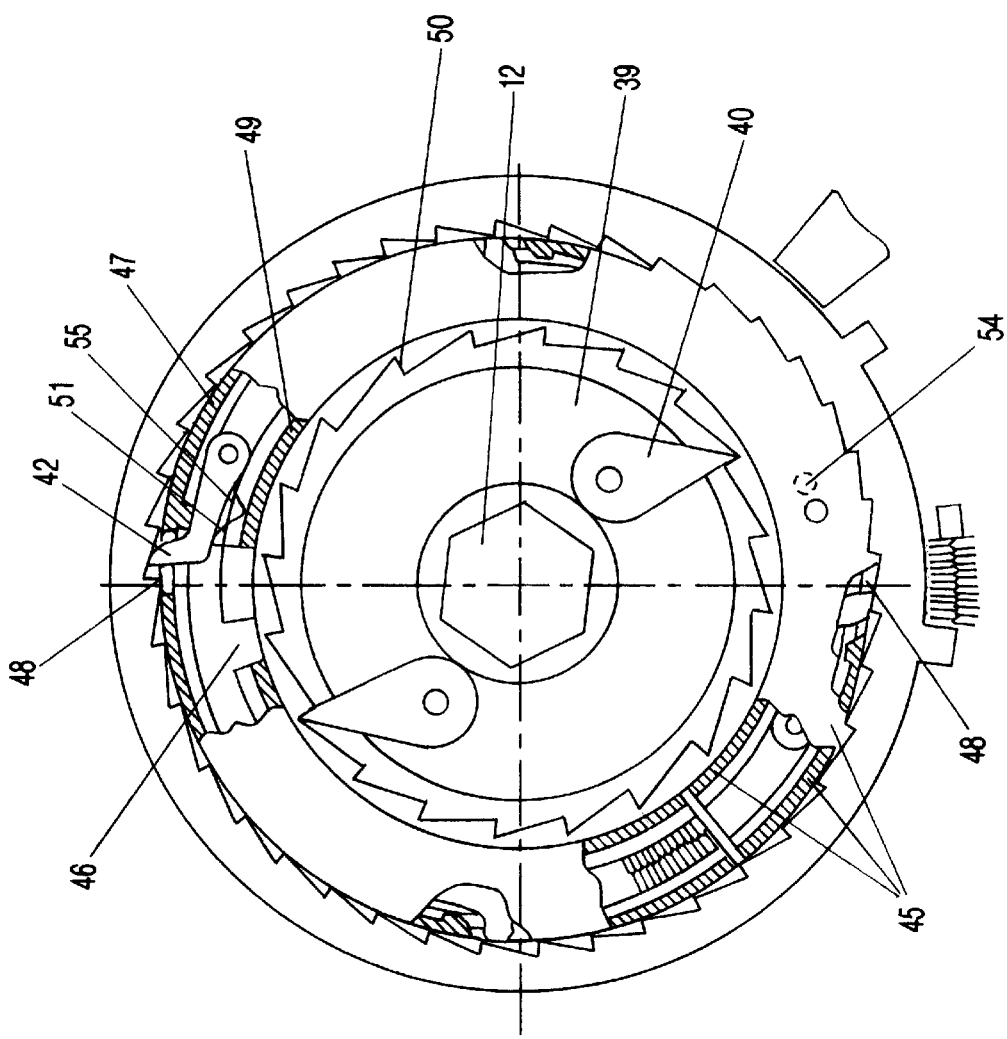
FIG. 4 the object of FIG. 3 after actuation of the tightening device.

The second embodiment of the invention represented in FIGS. 2–4 is concerned with a safety belt reeling device with tightening device and force limiting device in which the torsion bar with one end is directly connected to the rotatable belt reeling shaft and with its other end is connected to a counter coupling providing the abutment. In the drawings referring to this embodiment only the components are represented that are required for understanding the invention.

The belt reeling shaft 10 is supported in a U-shaped belt reeling housing 35. At one end it has a locking toothing 36 which is engaged by a non-represented locking pawl pivotably supported in the housing 35 and engaging the locking toothing in a locking situation whereby the movement of the locking pawl is controlled by a vehicle-sensitive and/or belt-sensitive control system that is not represented in detail.

The tightening device connected to one side of the belt reeling shaft is comprised of a drive cable 37 acting when actuated onto the drive disc 38. The pawl wheel 39 is fixedly connected to the drive disc 38. Tightening pawls 40 are connected to the pawl wheel 39 so as to be radially pivotable in order to provide coupling to the belt reeling shaft 10 in a manner to be disclosed in the following.

The force limiting device is comprised of a torsion bar 12 which is connected by a shaped piece 14 directly in a positive-locking manner to the belt reeling shaft 10 and with its other end provided with a shaped piece 14 positive-lockingly in a pawl support 41 supported thereat. The torsion bar 12 extends past the shaped piece 14 having correlated therewith the pawl support 41 as a shaft so that the pawl wheel 39 and its integral drive disc 38 are supported rotatably on this extension of the torsion bar 12. At the pawl support 41 four force-limiting pawls 42 are circumferentially distributed so as to be radially deflectable whereby the force limiting pawls 42 have coordinated therewith a toothed ring 43 with an inner toothing 43a. The toothed ring 43 is arranged at a corresponding leg of the housing 35 such that it is rotatable about an angle toward a stop 44 at the housing 35. The thus possible rotation of the toothed ring 43 relative to the housing 35 allows a controlled disengagement (not represented) of the locking pawl from the locking toothing 36 of the belt reeling shaft. A correspondingly arranged return spring 53 serves as a return force of the toothed ring 43 into its initial position, which will be disclosed in the following.

For a forced actuation of the force limiting pawls 42, being forced outwardly by a spring element 55, a coupling ring 45 is arranged at the coupling support 41 which is rotatable by a certain angular distance relative to the support. The movement of the coupling ring 45 relative to the pawl support 41 is limited by a corresponding stop 46. The coupling ring 45 comprises two concentrically arranged, axially extending projections whereby the outer projection 47 surrounds the circumference of the pawl support 41 and secures the force limiting pawls 42 in the engaged position. The outer projection 47 has windows 48 which, upon rotation of the coupling ring 45 relative to the pawl support 41, will be positioned such that the force limiting pawls 42 can engage through the windows 48 the inner toothing 43a of the toothed ring 43.

The pawl support 41 furthermore has an inner projection 49 which is provided with an inner toothing 50 arranged such that the tightening pawls 40 of the pawl wheel 39 upon actuation of the tightening device will engage the inner toothing 50 of the coupling ring 45. At the outer circumference of the inner projection 49 radially projecting cams 51 are arranged relative to the force limiting pawls 42 such that upon rotation of the coupling ring 45 relative to the pawl support the cams 51 will slide under the force limiting pawls 42 and thus force them into engagement with the inner toothing 43a of the toothed ring 43 and secure the deflected position of the force limiting pawls 42. For a return into the initial position, the coupling ring 45 is supported by a return spring 52 at the pawl support 41.

During the normal function of the safety belt reeling device, the force limiting pawls 42 are disengaged with respect to the toothed ring 43 so that upon rotation of the belt reeling shaft 10 the torsion bar 12 with the pawl support 41 arranged thereat can also rotate. The force limiting device is switched off. The tightening pawls 40 in their non-deflected normal position are also not in engagement with the toothing 50 of the coupling ring 45 so that the belt reeling shaft 10 can rotate freely.

When the tightening device is activated, the pawl wheel 39 is rotated by the drive disc 38 such that the tightening pawls 40 will radially engage the inner projection 49 of the coupling ring 45 and its inner toothing 50. This engagement causes the coupling ring 45 to be rotated whereby the pawl support 41, because of the connection of the torsion bar 12 to the belt reeling shaft 10 and because of its mass inertia, will stay behind the rotational movement of the coupling ring 45. In this manner, after breaking off of the correspondingly arranged shearing pin 45, a relative movement of the coupling ring 45 to the pawl support 41 against a return spring 52 will result which causes, on the one hand, the windows 48 in the outer projection 47 to be positioned above the force limiting pawls 42, and, on the other hand, the cams 51 at the inner projection 49 to move the force limiting pawls radially outwardly and secure them in this position. Upon rotation of the belt reeling shaft in the tightening direction, the force limiting pawls 42 due to the correlation of the inner toothing 43a of the tooth ring 43 will pass across the inner toothing 43a so that in this state no coupling is realized When after completion of the tightening device with initiated belt removal a reversal of the rotational direction occurs, the force limiting pawls 42 will engage the inner toothing 43a of the toothed ring 43 because of their deflected position caused the cams 51 of the coupling ring 45, whereby the toothed ring 43 is rotated by the predetermined angular distance relative to the housing 45 to the stop 44 and thus retains the locking pawl out of engagement at the locking toothing 36 of the belt reeling shaft 10. In this position, the toothed ring 43 provides the abutment, because of the pawl support 41 is secured by the force limiting pawls 42 and the form-locking connection to the one end of the torsion bar 12, for the force-compensating deformation of the torsion bar 12 upon further rotation of the belt reeling shaft 10 in the removal direction of the safety belt.

When after completion of the load movement a winding of the safety belt is initiated by the non-represented return spring, the return springs 53 for the toothed ring 43 and the return spring 52 for the coupling ring 45 return the parts relative to the housing 35 and the pawl support 41 into the initial position so that the safety belt reeling device is returned into its functional position.

The features of the object of these documents disclosed in the above description, the claims, the abstract, and the drawing maybe important individually as well as in any suitable combination for realizing the invention in its different embodiments.

The specification incorporates by reference the entire disclosure of German priority document 196 09 524.7 of Mar. 11, 1996, as well as of International Application PCT/EP97/01151 of Mar. 7, 1997.

The present invention is, of course, in no way restricted to the specific disclosure of the specification and drawings, but also encompasses any modifications within the scope of the appended claims.

What is claimed is:

1. A safety belt reeling device comprising:
    a belt reeling shaft (10) lockable by a vehicle-sensitive and/or belt-sensitive locking device;
    a tightening device;
    a tightening coupling connecting said tightening device to said belt reeling shaft when said tightening device is actuated;
    said tightening device comprising a drive disc (18, 38) and a drive device (37) for driving said drive disc (18, 38);
    a force limiting device comprising a torsion bar (12) connected to said belt reeling shaft (10) and to a stationary abutment;
    a pawl coupling activated by a tightening movement of said tightening device;
    said pawl coupling comprising at least one force limiting pawl for switching on or off said force limiting device as a function of functional states of said safety belt reeling device;
    said pawl coupling further comprising a coupling ring (23, 45) performing a relative rotation by an angular distance relative to said belt reeling shaft (10) in a rotational direction of said belt reeling shaft (10) defined by said tightening movement, wherein said relative rotation of said coupling ring (23, 45) is realized by the mass inertia of said belt reeling shaft (10), effective at the start of said tightening movement, relative to said drive disc (18, 38);
    a forced control (28, 29; 49, 51) controlling said force limiting pawl (27, 42) for switching on or off said force limiting device.

2. A safety belt reeling device according to claim 1, further comprising a tubular shaft (11) having an inner toothing and lockable by the locking device to provide said stationary abutment, wherein:
    said torsion bar (12) is positioned in said tubular shaft (11);
    said torsion bar (12) has a first end facing the locking device and a second end;
    said first end is fixedly connected to said tubular shaft (11);
    said second end is connected by said tightening coupling to said belt reeling shaft (10);
    said force limiting pawl (27) is pivotably supported on said belt reeling shaft (10) so as to be moveable into engagement with said inner toothing of said tubular shaft (11);
    said coupling ring (23) connected to an end face of said belt reeling shaft (10);
    said belt reeling shaft (10) having a stop (25);
    said relative movement of said coupling ring (23) is stopped at said stop (25);
    said coupling ring (23) and said force limiting pawl (27) are connected to one another by a pin-slot connection (28, 29) providing said forced control.

3. A safety belt reeling device according to claim 2, wherein said coupling ring (23) is secured in an initial position at said belt reeling shaft (10) by a shearing pin (54).

4. A safety belt reeling device according to claim 2, further comprising a return spring (26) connected to said coupling ring (23) and to said belt reeling shaft (10), wherein said coupling ring (23) is rotated relative to said belt reeling shaft (10) against the force of said return spring (26).

5. A safety belt reeling device according to claim 2, further comprising a stop ring (24) mounted on said belt reeling shaft (10) adjacent to said coupling ring (23), wherein said stop (25) is connected to said stop ring (24).

6. A safety belt reeling device according to claim 1, wherein said tightening coupling comprises a tightening pawl (17) pivotably connected to said drive disc (18) and a toothed ring (15) connected to said belt reeling shaft (10) and having an inner toothing (16), wherein said inner toothing (16) of said toothed ring surrounds said tightening pawl (17), wherein said toothed ring (16) and said coupling ring (23) are combined to form a unitary part.

7. A safety belt reeling device according to claim 1, wherein:

said torsion bar (12) has a first end and a second end;

said first end is directly connected to said belt reeling shaft (10);

said second end is connected to said tightening coupling providing said stationary abutment;

said tightening coupling has a pawl support (41) fixedly connected to said torsion bar (12), and a plurality of said force limiting pawls (42) are mounted on said pawl support (41);

said pawl coupling (41) further has a toothed ring (43) with an inner toothing (43a) for engagement by said force limiting pawls (42);

said toothed ring (43) is rotatable by a preset distance into a rotated position and secured in said rotated position;

said pawl support (41) is coupled by said tightening coupling to said drive disc (38) upon activation of said tightening device;

said coupling ring (45) is rotatably mounted on said pawl support (41);

said pawl support (41) has a stop (46) and said coupling ring (45) is rotatable relative to said pawl support (41) until contacting said stop (46);

said coupling ring (45) having cams (51) that, upon rotation of said coupling ring (45) relative to said pawl support (41), force said force limiting pawls (42) outwardly into said inner toothing (43a) of said toothed ring (43);

said coupling ring (45) having an inner toothing (50) coupling said drive disc (38) to said coupling ring (45).

8. A safety belt reeling shaft according to claim 7 wherein said coupling ring (45) in an initial position is secured at said pawl support (41) by a shearing pin (54).

9. A safety belt reeling shaft according to claim 7, further comprising a return spring (52) connected to said coupling ring (45) and to said pawl support (41), wherein said coupling ring (23) is rotated relative to said pawl support (41) against the force of said return spring (52).

10. A safety belt reeling device according to claim 7, wherein said coupling ring (45) is arranged adjacent to said pawl support (41) and has an outer axial projection (47) surrounding a circumference of said pawl support (41) to secure said force limiting pawls (42) in engagement at said pawl support (41), wherein said outer axial projection (47) has windows (48) and wherein said rotation of said coupling ring (45) relative to said pawl support (41) brings said windows (48) into an access position allowing said force limiting pawls (42) to penetrate said windows (48) and to engage said toothed ring (43) of said pawl coupling.

11. A safety belt reeling device according to claim 7, wherein said coupling ring (45) is arranged adjacent to said pawl support (41) and has an inner axial projection (49) positioned radially inwardly relative to said pawl support (41), wherein said inner toothing (50) of said coupling ring is connected to said inner axial projection (49), wherein said cams (51) are arranged as radial projections on said inner axial projection (49).

* * * * *